US011582250B2

(12) United States Patent
Drake et al.

(10) Patent No.: US 11,582,250 B2
(45) Date of Patent: Feb. 14, 2023

(54) SCANNING OF CONTENT IN WEBLINK

(71) Applicant: Bank of America Corporation, Charlotte, NC (US)

(72) Inventors: Keaton Drake, Charlotte, NC (US); Marci Landy, Waxhaw, NC (US); George Albero, Charlotte, NC (US); Cody Searl, Pineville, NC (US)

(73) Assignee: Bank of America Corporation, Charlotte, NC (US)

( * ) Notice: Subject to any disclaimer, the term of this patent is extended or adjusted under 35 U.S.C. 154(b) by 305 days.

(21) Appl. No.: 16/799,447

(22) Filed: Feb. 24, 2020

(65) Prior Publication Data

US 2021/0266338 A1 Aug. 26, 2021

(51) Int. Cl.
*H04L 29/06* (2006.01)
*H04L 9/40* (2022.01)
*G06F 16/22* (2019.01)

(52) U.S. Cl.
CPC ...... *H04L 63/1425* (2013.01); *G06F 16/2255* (2019.01)

(58) Field of Classification Search
CPC .................. H04L 63/1425; G06F 16/2255
See application file for complete search history.

(56) References Cited

U.S. PATENT DOCUMENTS

| 7,634,810 | B2 | 12/2009 | Goodman et al. |
| 8,521,667 | B2 | 8/2013 | Zhu et al. |
| 8,683,322 | B1 | 3/2014 | Cooper |
| 8,935,784 | B1 | 1/2015 | N |
| 9,356,941 | B1* | 5/2016 | Kislyuk .................. H04L 63/14 |
| 9,378,465 | B2 | 6/2016 | Stewart et al. |
| 9,386,029 | B2 | 7/2016 | Pham et al. |
| 9,594,903 | B1* | 3/2017 | L ........................... H04L 63/102 |
| 9,596,264 | B2 | 3/2017 | Sandke et al. |
| 9,985,978 | B2 | 5/2018 | Smith et al. |
| 10,009,362 | B2 | 6/2018 | Sandke et al. |
| 10,079,876 | B1* | 9/2018 | Chung .................... H04W 4/60 |
| 10,243,989 | B1* | 3/2019 | Ding .................. H04L 63/1425 |
| 10,282,368 | B2 | 5/2019 | Larsen et al. |
| 10,397,272 | B1* | 8/2019 | Bruss .................... G06F 21/568 |
| 10,666,676 | B1* | 5/2020 | Hsu ........................ H04L 51/12 |
| 2012/0204250 | A1* | 8/2012 | Anderson ............... H04L 63/18 |
| | | | 715/255 |
| 2013/0263263 | A1 | 10/2013 | Narkolayev et al. |

(Continued)

*Primary Examiner* — Shin-Hon (Eric) Chen
(74) *Attorney, Agent, or Firm* — Banner & Witcoff, Ltd.

(57) ABSTRACT

An illustrative computing system for a weblink content scanning system scans an electronic message for the presence of one or more weblinks. The computing system accesses, in a sandbox computing environment, content linked to the one or more weblinks. The computing system generates a hash of the accessed content and/or content linked to weblinks accessible via the accessed content. The computing system scans the content accessed via the one or more weblinks for a presence of malicious content and categorizes the scanned content accessed via the one or more weblinks (e.g., safe, malicious, and the like), associates the categorization with each corresponding hash, and saves such information to a data store for future analysis. Based on a result of this analysis, the computing system allows delivery of the original electronic message or generates a modified electronic message for delivery to a recipient device.

20 Claims, 10 Drawing Sheets

(56) References Cited

U.S. PATENT DOCUMENTS

| | | | |
|---|---|---|---|
| 2016/0021142 A1* | 1/2016 | Gafni | G06F 9/45558 |
| | | | 726/23 |
| 2016/0065613 A1* | 3/2016 | Cho | H04L 63/1416 |
| | | | 726/23 |
| 2017/0155665 A1* | 6/2017 | Dufour | H04L 63/1408 |
| 2018/0041376 A1 | 2/2018 | Li et al. | |
| 2019/0007426 A1* | 1/2019 | Bergström | H04L 63/1483 |
| 2019/0068616 A1* | 2/2019 | Woods | G06F 21/53 |
| 2019/0132273 A1* | 5/2019 | Ryan | H04L 51/12 |
| 2019/0173892 A1* | 6/2019 | Kemp | H04L 51/18 |
| 2020/0043041 A1* | 2/2020 | Shaw | G06Q 30/0248 |
| 2020/0076848 A1* | 3/2020 | Starink | H04L 63/1425 |
| 2020/0195694 A1* | 6/2020 | Kalinin | G06Q 10/107 |
| 2020/0412746 A1* | 12/2020 | Regentov | H04L 63/1425 |

* cited by examiner

SCANNING OF CONTENT IN WEBLINK

BACKGROUND

Aspects of the disclosure relate to the detection of malicious content that may be accessed through a weblink. In particular, one or more aspects of the disclosure relate to a system providing real-time detection, access management, and notification of links to malicious content sent through one or more electronic communication systems.

Many organizations (e.g., business organizations, educations institutions, governmental entities, and the like) use one or more electronic communication platforms to facilitate communication between users. Because of the nature of the communications platforms, these organizations implement procedures to maintain data security and to protect access to the computing networks connected to the communication platforms. For example, electronic communications (e.g., email, text messages, instant messages and/or other such electronic communications) received by users are a significant source of malicious content that may be used by an individual and/or a group attempting to gain unauthorized access to information contained within the network and/or to inflict damage to the network resources. In some cases, malicious content may spread through user clicks on seemingly benign weblinks, such as those sent through electronic messages (e.g., an email message). For example, a user may inadvertently access malicious content by selecting a weblink embedded in an electronic message. In doing so, the user may have introduced harmful content into the computing system and/or may have allowed an unauthorized user to gain access an otherwise secure network.

Cyber security applications or systems may scan the content of an electronic message to identify whether a weblink is included. In some cases, a cyber security system may attempt to mitigate potentially malicious content accessed through a weblink by categorizing each weblink based on its subject matter (e.g., legal risks, security, non-productive, business related, and the like) and then performing an action based on the determination of an assigned category. Some cyber security applications or systems may determine an appropriate action and/or security categorization for a received weblink based on feedback gathered from a group of users. For example, each user may provide information (e.g. answered questions) or may have actions monitored to determine a reaction to access of potentially harmful weblinks that may have been received through electronic communications and/or accessed on an internet website. These systems may rely on this collected data from the group of users when determining an action to perform with respect to individual weblinks. However, such systems lack the capability to perform real-time analysis on weblinks as they are received and to monitor and analyze potentially malicious content accessed through these weblinks.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, fast, reliable, and convenient technical solutions that address and overcome the technical problems associated with real-time detection, management, and mitigation of user access to malicious content communicated through one or more electronic communication systems.

In some cases, a weblink content scanning system may monitor electronic communications received via one or more communication networks and may identify whether each of the plurality of electronic messages includes one or more weblinks. After identifying the presence of one or more weblinks in an electronic message, the weblink content scanning system may open the one or more weblinks in a secure sandbox computing environment to isolate accessed content from the protected networks and may store a record of the weblink, along with associated information (e.g., sender information, recipient information, time/date information, number of times received or sent, and the like) in a data store. Within the sandbox computing environment, the weblink content scanning system may scan the accessed content for malicious or potentially malicious content and may generate a hash of the content accessible via the one or more weblinks. This hash may be used to identify and/or track weblinks, along with previously analyzed content that is accessible via the one or more weblinks. In some cases, content accessible via an accessed weblink may include one or more remote weblinks that also may be scanned and hashed, with hash(es) also being stored in the data store and may be associated with one or more of the parent weblink (e.g., the weblink embedded in a received message), the received message including the parent weblink, or both. In some cases, each hash may be compared to information stored in a data store containing hashes of previously accessed content. In some cases, the hashes stored in the data store may be categorized, such as with a category being associated with content that is safe to access, content including potentially malicious content, as malicious content, and the like. In some cases, the malicious content may further be categorized, such as with respect to a severity of harm that may be inflicted on the security, integrity, and/or operation computing devices across the enterprise computing system.

In some cases, the weblink content scanning system may isolate testing of each weblink encountered in electronic communications received via each network communicatively coupled to an enterprise computing network. For example, the weblink content scanning system may scan the content of an electronic message to identify weblinks. If one is found, the weblink may be accessed using a sandbox computing system to isolate the accessed content from the enterprise network. Once accessed, the content may be hashed and compared to a plurality of categorized hashes stored in the hash data store. If the hash matches a stored hash categorized as being safe, the weblink content scanning system may allow the original electronic communication to be delivered to the intended recipient. If the hash matches a stored hash categorized as being malicious, the weblink content scanning system may isolate the original electronic communication and does not allow the electronic communication to be delivered to the recipient. If the hash matches a stored hash categorized as being potentially malicious, the weblink content scanning system may replace the weblink in the original electronic communication with text indicating that a weblink had been removed. In some cases, the weblink content scanning system may generate a new message to be sent to the recipient of the original email and providing information concerning the original email and the potentially harmful linked content.

If a comparison of a hash to categorized hashes stored in the hash data store does not yield a match, the content accessible via the weblink may be analyzed for the malicious material. After analysis, a hash of the linked content may be categorized as malicious, potentially malicious, or non-malicious (e.g., safe). The weblink content scanning system may add the categorized hash of content to the data store for use in future comparisons. As mentioned above the content accessed through use of one or more weblinks contained in an electronic message is determined to be malicious (or potentially malicious), the weblink may be removed and/or a new electronic message may be sent to the recipient with a statement that potentially malicious content was removed from an electronic message, along with a description of the original electronic message and/or the removed weblink. If the content accessed through use of one or more weblinks contained in the electronic message is determined to be non-malicious, the electronic message may be cleared and may be sent to the recipient.

These features, along with many others, are discussed in greater detail below.

BRIEF DESCRIPTION OF THE DRAWINGS

The present disclosure is illustrated by way of example and not limited in the accompanying figures in which like reference numerals indicated similar elements in which.

DETAILED DESCRIPTION

Figure 1:
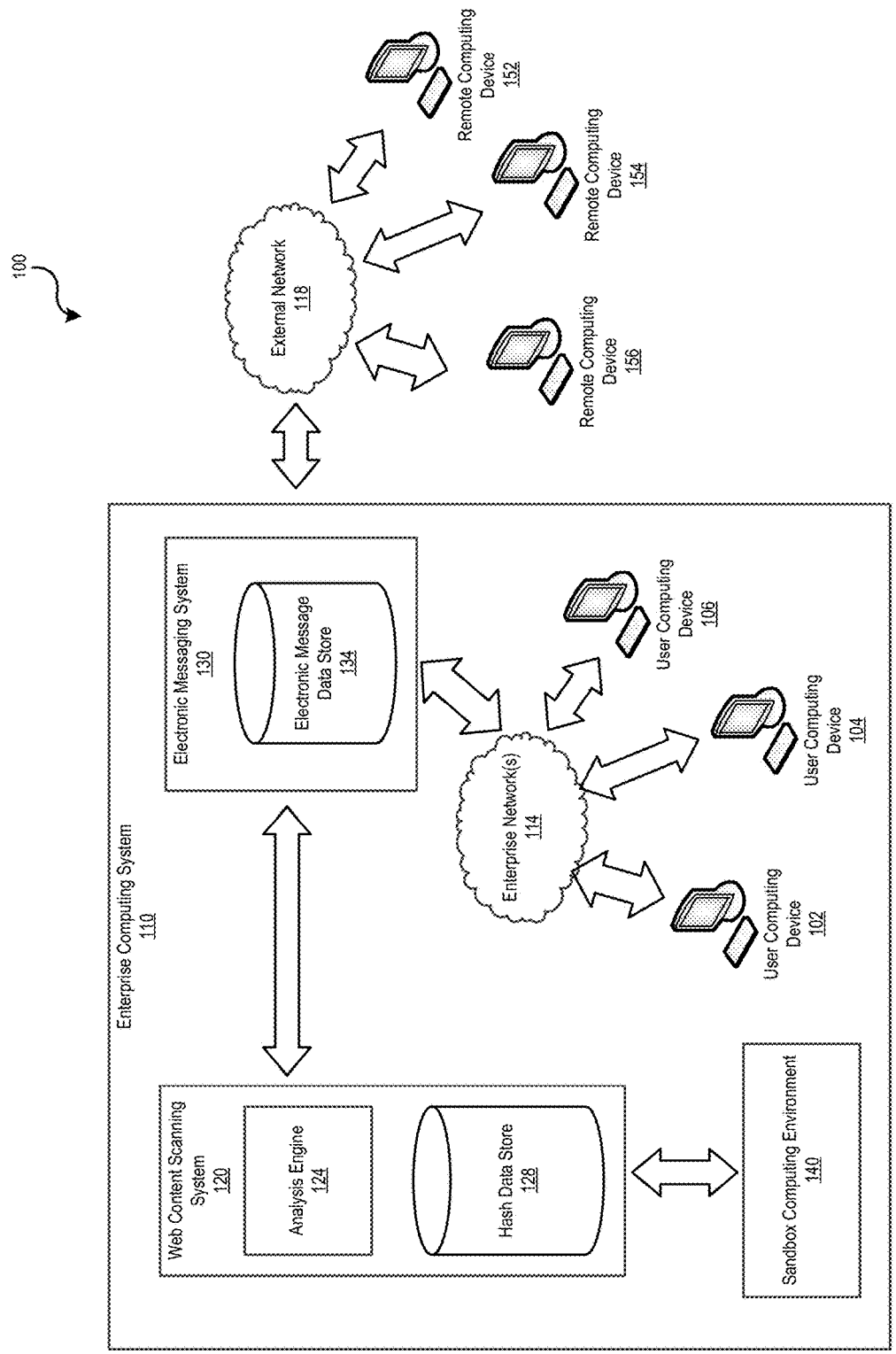
FIG. 1 depicts an illustrative computing environment of weblink content scanning for real-time detection, management, and mitigation of user access to malicious content communicated through one or more electronic communication systems according to aspects of this disclosure.

In the following description of various illustrative examples, reference is made to the accompanying drawings, which form a part hereof, and in which is shown, by way of illustration, various examples in which aspects of the disclosure may be practiced. It is to be understood that other structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some illustrative arrangements in which the systems described herein may be used. Various other arrangements employing aspects described herein may be used without departing from the present disclosure.

A need has been identified for an improved and robust system capable of identifying potential sources of malicious content accessed through links embedded in an electronic communication. Aspects described herein are directed to developing a system for monitoring electronic communication systems. For example, an illustrative system may scan content of electronic messages for weblinks that direct to potentially malicious content and analyze the linked content in an isolated environment (e.g., a sandbox computing environment) for malicious content. The illustrative system may determine and store, in a data store, a hash corresponding to the linked content associated with each of the weblinks identified in the electronic messages. Based on a comparison of the hash to information stored in the data store, the system may identify whether the weblink has previously been associated with malicious content. If not, the linked content may be analyzed to determine whether malicious content would have been accessed had the link been selected by a user. Based on the analysis of the linked content, the hash may be assigned a categorization (e.g., safe, malicious, and the like). The system may then communicate one of the original electronic communication if the weblinks were determined to be safe or a modified electronic communication (or new electronic communication), based on a categorization associated with the weblink.

In some cases, organizations (e.g., a financial institution, a wellness care provider, a governmental agency, an educational institution, a business organization, and the like) may utilize various resources to support communication between individuals and groups within and without the organization. Illustrative electronic communication methods may include email communication, text messaging communication, instant messaging communication, and the like. For example, email communication systems remain as a primary communication method for a majority of enterprises. As such, email communication systems may be a significant source of malicious content that may be introduced into an otherwise secure network. Such malicious content may allow an unauthorized individual or group of individuals to gain unauthorized access to network resources including, for example, non-public or private information contained within the network. In some cases, malicious content may be communicated in one or more different forms. For example, malicious content may be sent directly as attachments to the electronic communication and/or malicious content may be remotely accessed through the use of weblinks that may be embedded, or otherwise included, in the electronic communication. Accordingly, organizations, such as those with stored confidential and/or otherwise non-public information may monitor electronic messages sent or received by the organization's electronic communication systems for links that direct to potentially malicious content.

In some cases, a weblink may be categorized based on its linked content, where an assigned category may be used to determine an appropriate action and/or security category. Because content accessible via a weblink may change at the destination, existing applications and/or systems may still expose a user to potentially malicious content through weblinks previously identified as "safe", thus allowing a user to accidently introduce harmful material into an enterprise computing environment.

In some cases, a weblink content scanning system may be used to analyze an electronic message that is received via a network by an electronic messaging system. The electronic message may be processed by the weblink content scanning system before the electronic message is delivered to the recipient to ensure data security of the enterprise computing system. In some cases, the content of the electronic message may be scanned by an analysis engine of the weblink content scanning system to identify the presence of one or more weblinks. Such weblinks may include a uniform resource locator (URL) contained directly in the electronic message with the purpose of directing a browser, or other computing application, to linked content via a network. For example, an electronic message may contain a URL, where the URL is a reference to a linked web resource that specifies its location on a local or remote computer network and/or a mechanism for retrieving the linked content. If one or more weblinks are identified within a received message, the content accessible via the one or more weblinks may be accessed within a sandbox computing environment, so that the linked content may be evaluated in a secure environment.

In some cases, an electronic message may be received. It may be determined by an analysis engine if the electronic message contains one or more weblinks. If the electronic message does not contain one or more weblinks, the analysis engine may release the original electronic message and allow the original electronic message to be delivered to the intended recipient. In some cases, if the electronic message does contain one or more weblinks, content accessed via the one or more weblinks may be analyzed within the sandbox computing environment to prevent any potentially malicious content from accidentally being introduced into a secure network. Within the sandbox computing environment, the content accessible via the one or more weblinks may be scanned to generate a hash of the linked content. The hash of the content accessed via the one or more weblinks may be compared to stored information in a hash data store. The stored information may include hashes of content previously accessed through weblinks. The hashes of content in the data store may be each be associated with a category (e.g., "safe", "malicious", and the like). If the hash of the content accessed via a weblink of the electronic message matches a categorized hash in the hash data store, based on the associated category of the matching hash, the analysis engine may determine if the content accessed via the weblink is malicious or safe to access. If the hash of the content accessed via a weblink does not match a categorized hash in the hash data store, the accessed content may be scanned and analyzed for malicious content. After scanning the accessed content, the analysis engine may associate a category (e.g., "safe", "malicious", and the like) to a hash of the accessed content. After associating a category to the hash of the accessed content, the analysis engine may store the categorized hash and the associated weblink in the hash data store to serve as a reference for future comparisons. In some cases, additional information may be associated with the categorized hash and its associated weblink, such as an information of other weblinks associated with the linked content, a sender of a message containing the weblink, a recipient of the message, and the like.

In some cases, remote weblinks may be embedded, or otherwise included, in the content accessed through the weblinks received in a communication. In some cases, content linked to these remote weblinks may change over time, such as after a categorization has been performed. As such, content linked to these remote weblinks may be hashed, analyzed and categorized, as discussed above. For generated hashes of the content accessible via remote weblinks, if a hash matches a stored hash in the hash data store, the categorization may be associated with the parent weblink (e.g., the weblink embedded in a received message), the hash of the content accessible via the parent weblink, and/or the received message including the parent weblink. If the generated hashes of the content accessible via the remote weblinks do not match with hashes in the hash data store, after further analysis and categorization, the associated categories for the hashes may be associated with the parent weblink, the hash of the content accessible via the parent weblink, and/or the received message including the parent weblink. If the content accessible via a remote weblink is found to be safe to access based on matching stored hash data and/or analysis of the content accessible via the weblink, the parent weblink and the hash of the content accessed via the parent weblink may not be categorized as safe to access until the content accessible via the parent weblink undergoes further analysis. For example, a remote weblink accessed via the content of a parent weblink may be found to be safe to access, however, the content accessible via the parent weblink may contain malicious content. As such the hash of the content accessible via the parent weblink may be categorized as malicious, although the hash of the content accessible via the remote weblink may be categorized as safe to access. In some cases, if content accessible via the remote weblinks contains further weblinks, the scanning process would continue as described. In some cases, the scanning process would terminate analysis of remote weblinks at a specific level (e.g., depth) of a weblink. For example, scanning of the content accessible via a weblink may terminate at the fifth level of a weblink, where a level of a weblink is a degree of separation from the weblink contained in the electronic message.

If the analysis engine deems a received message to be safe based on analysis of the linked content, the analysis engine may release the original electronic message and allow the original electronic message to be delivered to the intended recipient. In some cases, based on the determination that malicious content may be accessible via one or more weblinks, the analysis engine may be configured to modify the received electronic message and/or generate a new electronic message. For example, the analysis engine may modify the original message by removing and/or disabling the one or more weblinks received within the original electronic message before sending the modified electronic message to the intended recipient. In some cases, the modified electronic message may include a notification indicating that a weblink has been removed and/or disabled within the original electronic message. In some cases, a modification to an electronic message by the analysis engine may trigger generation of a report and/or sending of a notification to an enterprise system administrator, where the notification includes information about the identified weblink and/or the modified electronic message. The information in the notification or report may include at least a portion of the original electronic message, the recipient of the electronic message, the sender of the electronic message, and/or information about the identified malicious content and/or weblinks. In some cases, delivery of the notification may be initiated by triggering an alert system to generate an alert user interface screen for display by a different computing device (e.g., the recipient computing device of the original electronic message, an administrator computing device, and the like).

FIG. 1 depicts an illustrative computing environment 100 for weblink content scanning and/or real-time detection, management, and mitigation of user access to linked malicious content communicated through one or more electronic communication systems. An enterprise computing system 110 may include a weblink content scanning system 120 configured to scan electronic messages received via one or more electronic communication networks (e.g., an electronic messaging system 130), a sandbox computing environment 140 communicatively coupled to the weblink content scanning system 120, one or more networks 114 and one or more devices (e.g., user computing device 102, 104, 106 and the like) communicatively coupled to the one or more networks. The elements of the enterprise computing system 110 may be combined or altered and their functionality may be changed without departing from the present disclosure. In some cases, the user computing devices 102, 104, and 106 may be used by an authorized user of the enterprise computing system 110 to access data and/or applications within the enterprise computing system 110 through use of the one or more enterprise networks 114. The enterprise network 114 may be a wired or wireless network, such as the networks described below with respect to FIGS. 9 and 10.

In some cases, the user computing devices 102, 104, and 106 may be one of a mobile device, tablet, laptop computer, desktop computer, and/or another such computing device capable of communicating via a network to allow the user to access data and/or utilize networked applications, such as the electronic messaging system 130 to send and/or receive electronic messages with computing devices within and/or external to the enterprise computing system.

In some cases, one or more remote computing devices (e.g., remote computing device 152, 154, and 156) may communicate with the enterprise computing system 110 via one or more communication networks (e.g., external network 118), such as a wide area network, a local area network, the Internet, a telecommunications network, and the like. The external network 118 may be a wired network or a wireless network. In some cases, one or more of the remote computing devices (e.g., 152, 154, and/or 156) may be used to send electronic communications (e.g., an electronic message) to a recipient device (e.g., 102, 104, or 106) within the enterprise computing system 110.

In some cases, the weblink content scanning system 120 may include an analysis engine 124 and a hash data store 128, where the weblink content scanning system 120 may monitor communications sent via the electronic messaging system 130 to identify messages containing weblinks to prevent user access to linked malicious content. The electronic messaging system 130 may include an electronic message data store 134 to hold electronic messages received by the electronic messaging system 130. For example, the electronic message data store 134 may store messages that are to be sent and/or received by devices within the enterprise computing system 110. Such messages may be formatted for communication by a plurality of electronic messaging client platforms (e.g., email messaging platforms, text messaging platforms, instant messaging platforms, and the like) hosted locally and/or remotely. The electronic messages may originate from computing devices within and/or outside the enterprise computing system 110, such as via the enterprise network 114 and/or the external network 118. For example, an electronic message may be sent from a computing device (e.g., the remote computing device 152) to a recipient computing device (e.g., user computing device 102) within the enterprise computing system 110. In some cases, such electronic messages may be stored within the electronic message data store 134 before delivery to an intended recipient computing device of the enterprise computing system 110. In some cases, the electronic message may be held for analysis by the weblink content scanning system 120 to determine whether malicious content may be linked to a weblink included in the electronic message (e.g., within a body of the electronic message, within an attachment to the electronic message, and the like).

To detect, manage, and mitigate user access to malicious content that may be communicated through one or more electronic communication systems, the weblink content scanning system 120 may analyze electronic messages received by the electronic messaging system via a network (e.g., the enterprise network 114, the external network 118, and the like). In some cases, the electronic messages may be held and processed by the weblink content scanning system 120 before delivery to a recipient computing device to facilitate data security of the enterprise computing system 110.

For example, the analysis engine 124 may analyze content of an electronic message (e.g., the message body, an attachment, and the like) to identify one or more weblinks (e.g., a URL embedded in the message body or within an attachment). If the analysis engine 124 does not identify one or more weblinks in the electronic message, the analysis engine 124 may release the electronic message to the electronic messaging system 130 in order to allow the electronic message to be sent to the recipient (e.g., user computing device 102). Additionally or alternatively, the analysis engine 124 may identify one or more weblinks and analyze the content accessible via each weblink in the sandbox computing environment 140.

In some cases, the sandbox computing environment 140 may include an isolated, secure environment (e.g., no access to other networked components) within the enterprise computing system 110 that mimics an end user operating environment. The isolated, secure environment ensures that the execution, operation, and processing that occurs within the sandbox computing environment is not affected and/or does not affect other running programs and/or applications. The sandbox computing environment 140 may include a test server, a development server, and/or working directory within the enterprise computing system 110. The sandbox computing environment 140 may allow for analysis, monitoring, and evaluation of the content accessible via a weblink without risk of harm to the wider enterprise computing system 110 and/or to other connected systems and/or computing devices.

In some cases, the analysis engine 124 may generate a hash corresponding to the linked content accessed in the sandbox computing environment 140. The analysis engine 124 may compare the generated hash to information stored in the hash data store 128 (e.g., hashes of content accessible via previously analyzed weblinks). With this comparison, the analysis engine 124 may determine if the content accessible via the weblink was previously analyzed by the weblink content scanning system 120 and/or was categorized as either malicious (e.g., potentially and/or known as harmful to the system) or non-malicious (e.g., safe to access). For example, malicious content may include material (e.g., malware) harmful to the security, integrity, and/or operation of computing devices and/or data across the enterprise computing system 110. For example, such malicious content, when accessed via a computing device (e.g., user computing device 102) with access to the enterprise networks 114, may allow an unauthorized user to gain access to information stored on or applications running within an otherwise secure enterprise computing system 110.

If the analysis engine 124 determines that the generated hash matches a stored hash categorized as being safe, the weblink content scanning system 120 may trigger the electronic messaging system to release the original electronic message for delivery to the intended recipient. Further, if the analysis engine determines that the generated hash matches a stored hash categorized as being malicious (or potentially malicious), the weblink content scanning system 120 may modify the original message by replacing the weblink in the original electronic message, such as with text indicating that the weblink has been removed. In some cases, the weblink content scanning system 120 may generate a new electronic message to be sent to the recipient of the original electronic message, where the new electronic message includes information concerning the original electronic message and notification of the potentially harmful linked content accessible via a weblink found within the original electronic message.

If the analysis engine 124 does not find a match between the generated hash and stored hash information of the hash data store 128, the analysis engine 124 may further analyze the content accessible, as described with reference to FIGS. 2-4 below.

Figure 2:
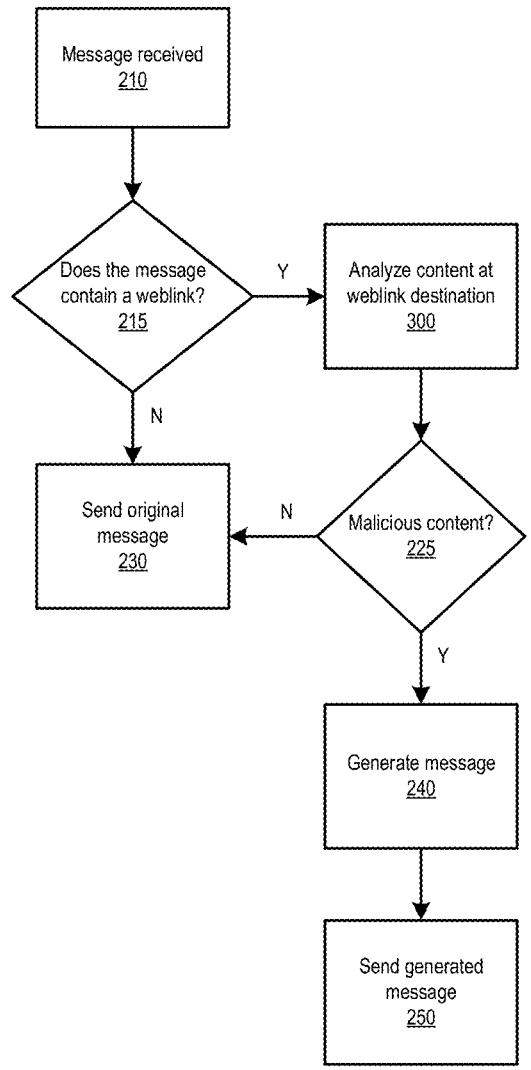
FIG. 2 depicts an illustrative event sequence of weblink content scanning for real-time detection, management, and mitigation of user access to malicious content communicated through one or more electronic communication systems according to aspects of this disclosure.

FIG. 2 depicts an illustrative event sequence for analyzing content accessible via a weblink and/or real-time detection, management, and mitigation of user access to linked malicious content communicated through one or more electronic communication systems. The events shown in the illustrative event sequence are illustrative and additional events may be added, or events may be omitted, without departing from the scope of the disclosure. At 210, an electronic message may be received by the electronic messaging system, where delivery of the electronic message may be delayed until contents of the electronic message may be scanned for weblinks and/or until contents accessed via one or more weblinks included in the electronic message may be analyzed. The electronic message may be a message sent and/or received via an electronic communication network. In some cases, the electronic messaging system 130 (e.g., an email platform, a text messaging platform, an instant messaging platform, a file transfer protocol (FTP) platform, and the like) may be hosted locally or remotely to the enterprise computing system 110. The sender of the electronic message may be a computing device within the enterprise computing system 110 (e.g. user computing device 102) or a computing device outside the enterprise computing system 110 (e.g., remote computing device 156). After receiving an electronic message, at 215, the weblink content scanning system 120 may determine whether the electronic message contains at least one weblink within the body of the electronic message and/or within an attachment to the electronic message. An included weblink may be a uniform resource locator (URL) contained directly in the body of the electronic message or may be embedded in an image, as a hyperlink, and/or the like. If at least one weblink is found, the content accessible via each weblink may be analyzed at 300, as described with respect to FIG. 3 below. If the electronic message does not contain a weblink, the original electronic message may be released by the weblink content scanning system 120 so that the electronic message may be sent to the recipient (e.g., user computing device 102) by the electronic messaging system 130 at 230, such as via the enterprise network 114 and/or the external network 118.

After analysis of the one or more weblinks at 300, the weblink content scanning system 120, at 225, may determine that content that is potentially and/or known to be malicious may be accessible via at least one of the weblinks found in the electronic message. If not, (e.g., accessed content was found to be safe to access), the weblink content scanning system 120 may release the original electronic message to be sent to the recipient (e.g., user computing device 102) by the electronic messaging system 130, at 230. If, however, the accessed content is determined to potentially and/or known to be malicious, a modified electronic message may be generated, such as by the weblink content scanning system 120, at 240. For example, the weblink content scanning system 120 may modify the original electronic message by removing and/or disabling each weblink of the one or more weblinks of the original electronic message found to access malicious content.

In some cases, weblink content scanning system 120 may include a notification in the electronic message, where the notification may include information regarding each removed or disabled weblink and/or associated analytics information corresponding to the original electronic message (e.g., sender information, recipient information, time/date information, number of times a particular weblink categorized as being malicious has been received or sent, and/or the like). In some cases, notification may include a description of each removed and/or disabled weblink. In some cases, the notification may be sent separately from the generated electronic message, such as in a new electronic message and/or in a report. For example, this notification may be sent to the intended recipient of the original message, the sender of the original message, and/or to a system administrator for further analysis. At 250, the generated electronic message may be sent to the recipient (e.g., user computing device 102) by the electronic messaging system 130 via the enterprise network 114 and/or external network 118.

Figure 3:
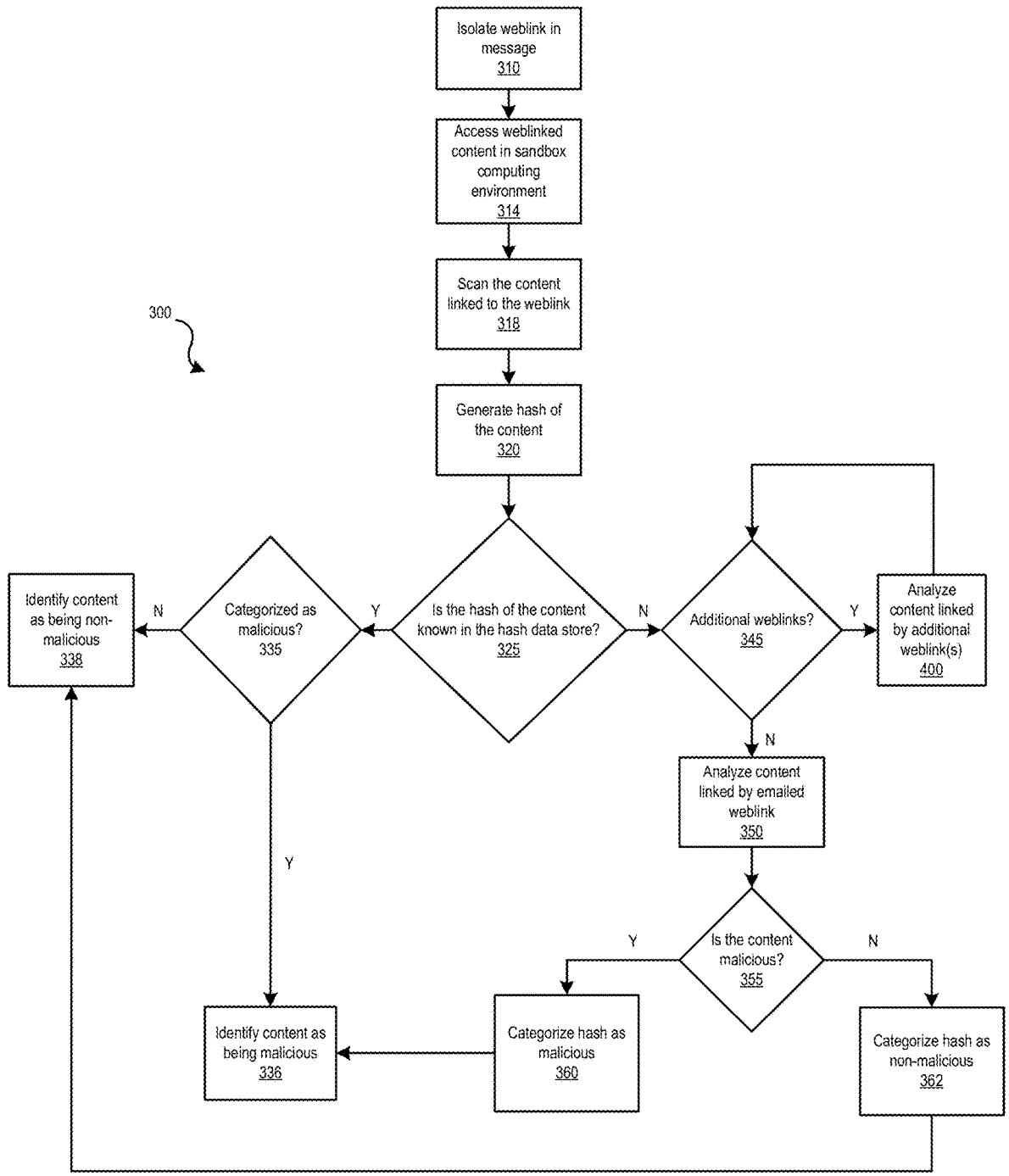
FIG. 3 depicts an illustrative event sequence of weblink content scanning for analyzing a weblink contained in an electronic message in order to determine potentially malicious content accessible via the destination of the weblink according to aspects of this disclosure.

FIG. 3 depicts an illustrative event sequence 300 for analyzing content accessible via a weblink and/or real-time detection, management, and mitigation of user access to linked malicious content communicated through one or more electronic communication systems. The events shown in the illustrative event sequence are merely one illustrative sequence and additional events may be added, or events may be omitted, without departing from the disclosure. At 310, the weblink content scanning system 120 may isolate one or more weblinks in a received electronic message. At 314, the content accessible via the one or more weblinks may be opened in the sandbox computing environment 140, where the content accessible via the one or more weblinks may undergo further analysis by the weblink content scanning system 120. At 318, the content accessible via the one or more weblinks may be scanned by the analysis engine 124 of the weblink content scanning system 120. The scan may determine the content accessible via the one or more weblinks and/or identify one or more remote weblinks contained at the content accessible via the one or more weblinks. At 320, hashes of one or more weblinks and of the content accessible via the one or more weblinks may be generated by a hash function of the analysis engine 124. The hash function (e.g., MD5, SHA-2, RIPEMD, BLAKE2, and the like) may include a mathematical function that assigns a specific value (e.g., letters, numbers, characters) of a fixed or variable size to a digital file record (e.g., web page, weblink, file). For example, the character string "weblink" may yield a hash of "707106e408f4fef6a986b2cdcf085ce3" via an MD5 hash generator. A change in the content of a digital file record would produce a change in a newly generated hash for the digital file record, which ensures that even if the content accessible via a weblink was previously hashed and stored, any change in the content accessible via the weblink would be recognizable by the weblink content scanning system 120.

At 325, each generated hash of the content accessible via the one or more weblinks may be compared to hashes in the hash data store 128. This comparison may be used to determine whether each hash is known to and/or was previously analyzed by the weblink content scanning system 120. For example, the hash data store 128 may include hashes of the content accessible via previously scanned weblinks. The hashes stored in the hash data store 128 may be assigned a categorization. The categorization may be malicious (e.g., potentially and/or known to be malicious) or non-malicious (e.g., safe to access). If a generated hash matches a stored hash in the hash data store 128, at 335, the analysis engine 124 may determine if the matching stored hash is categorized as malicious or non-malicious. If the stored hash of the hash data store 128 is categorized as malicious, at 338, the event sequence may return a malicious response for the generated hash of the content accessible via the weblink. If the matching stored hash of the hash data store 128 is categorized as non-malicious, at 336, the event sequence may return a non-malicious response for the generated hash of the content accessible via the weblink.

Additionally or alternatively, if a hash of the content accessible via a weblink of the one or more weblinks does not match a stored hash in the hash data store 128, at 345, the analysis engine 124 may determine if the content accessible via the weblink contains one or more remote weblinks. Remote weblinks may include weblinks that are not directly accessible from within the electronic message and/or are accessible via a parent weblink derived from the electronic message. If the content accessible via the one or more weblinks does contain one or more remote weblinks, at 400, the one or more remote weblinks may be opened in the sandbox computing environment 140 and analyzed by the analysis engine 124. After analysis of the one or more remote weblinks at 400, the event sequence may return to 345 to compare other remote weblinks, if necessary. In some cases, additional remote weblinks may be tested for a fixed weblink depth. The weblink depth may include the number of weblinks removed (e.g., distance from) from the original electronic message. For example, a weblink depth of 5 may represent that 5 weblinks were accessed to reach linked content at a networked destination.

The content accessible via the one or more weblinks may be analyzed for potentially malicious content at 350. If the content accessible via the one or more weblinks does not contain one or more remote weblinks, at 350, the content accessible via the one or more weblinks may be analyzed for potentially malicious content by the analysis engine 124. After analyzing the content accessible via the one or more weblinks at 350, the analysis engine 124 may determine if the content accessible via the one or more weblinks is potentially malicious at 355. If the content accessible via a weblink is determined to be malicious at 355, the hash of the content accessible via the weblink may be categorized as malicious and stored in the hash data store 128 at 360. The categorization may be performed by the analysis engine 124. In some cases, the categorized hash of the content accessible via each weblink may be stored with the weblink, the hash of the weblink, and access metrics for the hash and the weblink in the hash data store 128. After categorization and storage of each hash of the content accessible via the one or more weblinks at 360, the event sequence may return a malicious response for hashes of the content accessible via the one or more weblinks at 336.

If the content accessible via a weblink is determined to be non-malicious (e.g., safe to access) at 355, the hash of the content accessible via the weblink may be categorized as non-malicious and stored in the hash data store 128 at 362 by the analysis engine 124. After categorization and storage of each hash of the content accessible via the one or more weblinks at 362, the event sequence may return a non-malicious response for the hashes of the content accessible via the one or more weblinks at 338.

Figure 4:
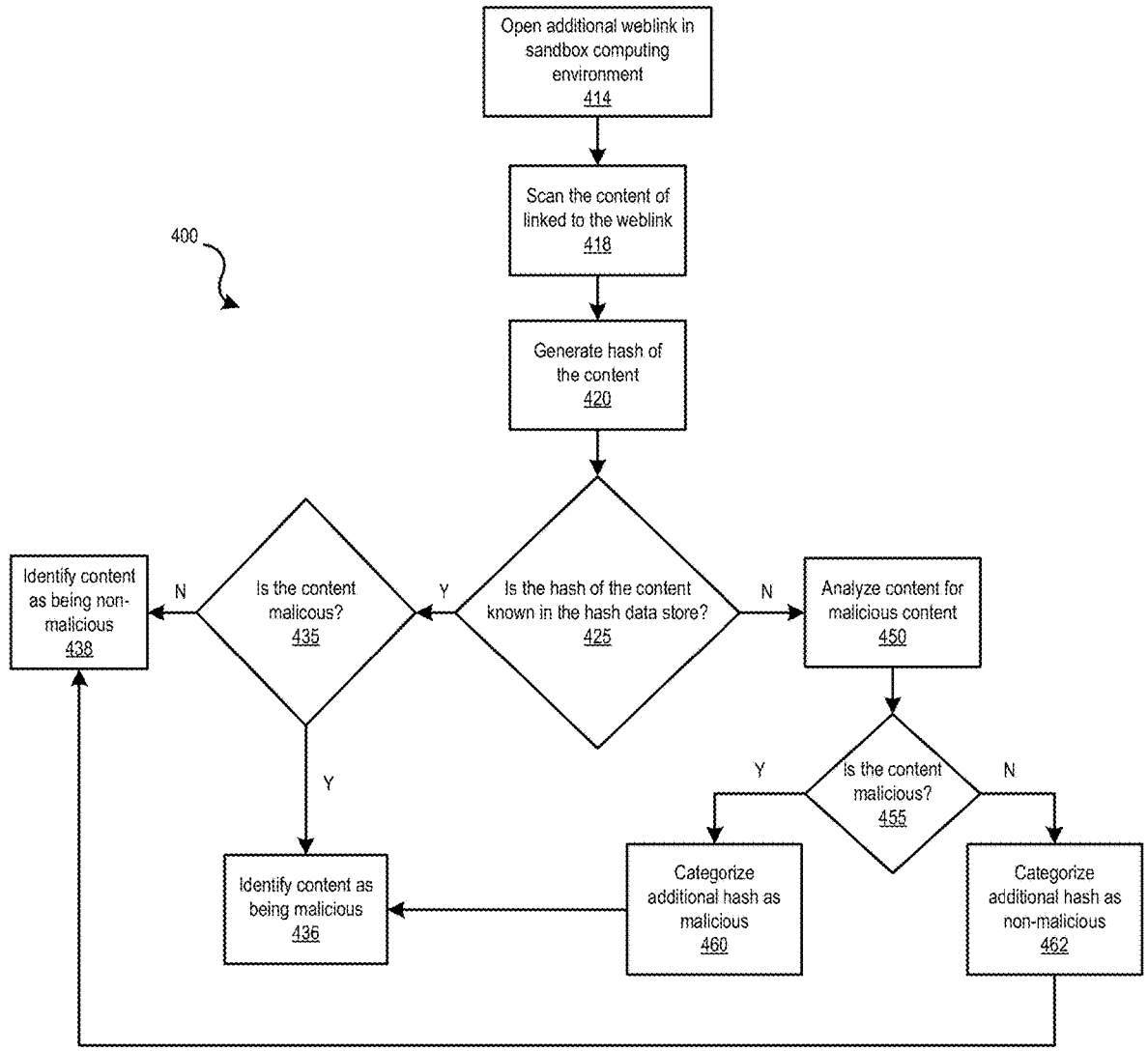
FIG. 4 depicts an illustrative event sequence of weblink content scanning for analyzing a remote weblink in order to determine potentially malicious content accessible via the remote weblink according to aspects of this disclosure.

FIG. 4 depicts an illustrative event sequence 400 for analyzing content accessible via a weblink and/or real-time detection, management, and mitigation of user access to linked malicious content communicated through one or more electronic communication systems. The events shown in the illustrative event sequence are merely one illustrative sequence and additional events may be added, or events may be omitted, without departing from the disclosure. At 414, the content accessible via the one or more remote weblinks may be accessed in the sandbox computing environment. At 418, the content accessible via the one or more remote weblinks may be scanned by the analysis engine 124. The scan may be used to determine the content accessible via the one or more remote weblinks. At 420, hashes of the one or more remote weblinks and of the content accessible via the one or more remote weblinks may be generated by the hash function of the analysis engine 124.

At 425, each generated hash of the content accessible via the one or more remote weblinks may be compared to stored hashes in the hash data store 128. If a hash of the content accessible via a remote weblink of the one or more remote weblinks matches a stored hash, at 435, the analysis engine 124 may determine if the stored hash that matches the generated hash is categorized as malicious or non-malicious. If the stored hash of the hash data store 128 is categorized as malicious, at 438, the event sequence may return a malicious response for the generated hash of the content accessible via the remote weblink. If the matching stored hash of the hash data store 128 is categorized as non-malicious, at 436, the event sequence may return a non-malicious response for the hash of the content accessible via the remote weblink.

Additionally or alternatively, if the hashes of the content accessible via the one or more remote weblinks do not correspond to a stored hash, the content accessible via the one or more remote weblinks may be analyzed for malicious content at 450. After analyzing the content accessible via the one or more remote weblinks at 450, it may be determined if the content of the one or more remote weblinks is malicious at 455. If the content accessible via a remote weblink is determined to be malicious at 455, the hash of the content accessible via the remote weblink may be categorized by the analysis engine 124 as malicious and stored in the hash data store 128 at 460. In some cases, the categorized hash of the content accessible via each remote weblink may be stored with the remote weblink, the hash of the remote weblink, and access metrics for the hash and the remote weblink in the hash data store 128. After categorization and storage of the hash of the content accessible via the remote weblink at 460, the event sequence may return a malicious response for the hash of the content accessible via the remote weblink at 436. If the content accessible via the remote weblink is determined to be non-malicious (e.g., safe to access) at 455, the hash of the content accessible via the remote weblink may be categorized as non-malicious and stored in the hash data store 128 at 462. The categorization may be performed by the analysis engine 124. After categorization and storage of the hash of the content accessible via the remote weblink at 462, the event sequence may return a non-malicious response for the hash of the content accessible via the remote weblink at 438.

Figure 5:
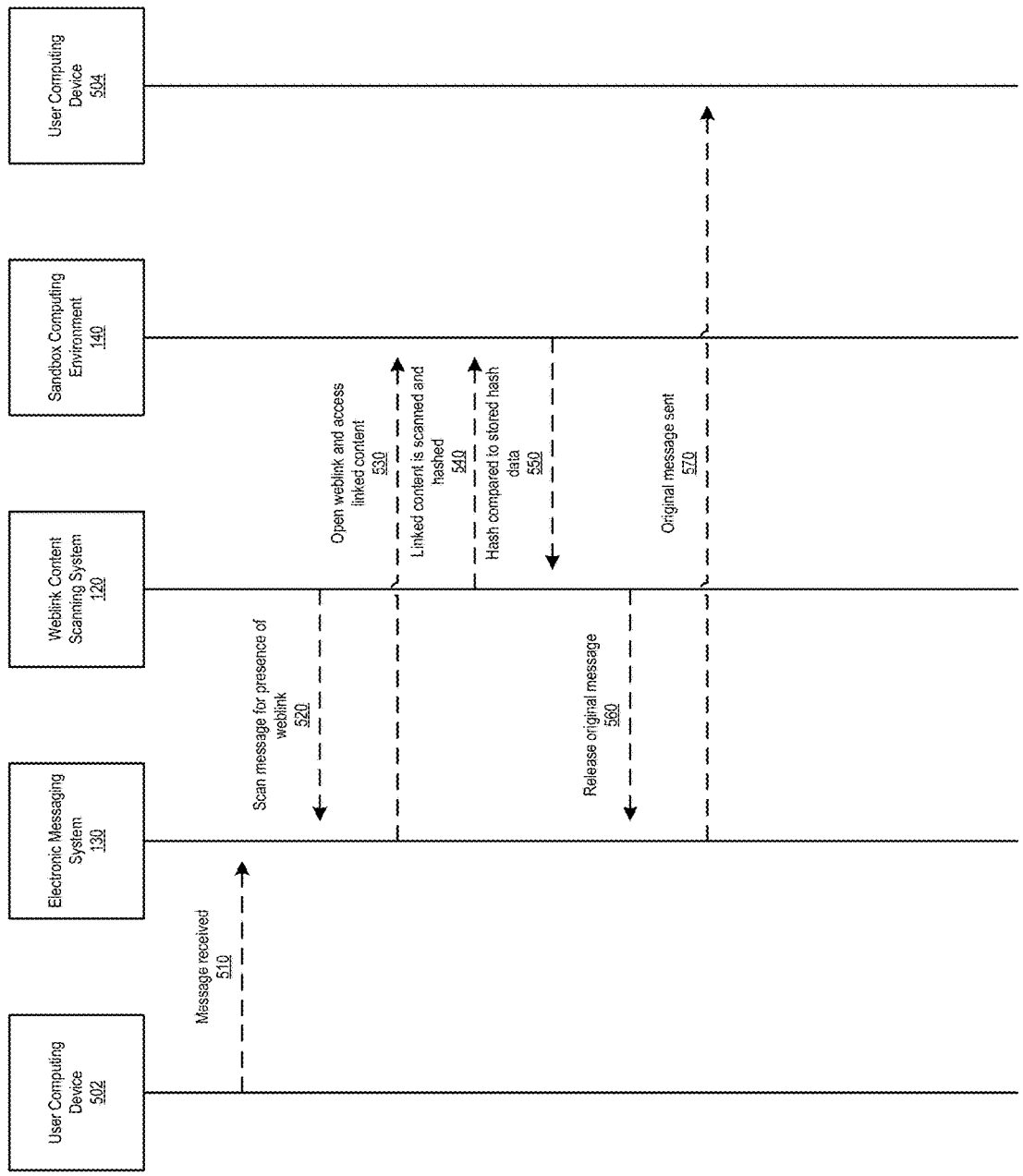
FIG. 5 shows an illustrative example of a process for real-time detection, management, and mitigation of user access to potentially malicious content communicated through one or more electronic communication systems according to aspects of this disclosure.

FIG. 5 shows an example of an illustrative process for real-time detection, management, and mitigation of user access to malicious linked content communicated through one or more electronic communication systems. The events are merely one illustrative sequence and additional events may be added, or events may be omitted, without departing from the disclosure. At 510, the electronic messaging system 130 may receive an electronic message sent by the user computing device 502. The user computing devices 502 and 504 may be one of a mobile device, tablet, laptop computer, desktop computer, and/or another such computing device capable of communicating via a network to allow the user to access data and/or utilize networked applications, such as the electronic messaging system 130 to send and/or receive electronic messages with computing devices within and external to the enterprise computing system. After the electronic messaging system 130 receives the electronic message via the enterprise network 114 or external network 118, the weblink content scanning system 120 may scan the electronic message within the electronic messaging system 130 for the presence of one or more weblinks at 520. After the weblink content scanning system 120 determines a weblink is present, the weblink may be opened in the sandbox computing environment 140 to analyze the content accessible via the weblink at 530. Within the sandbox computing environment 140, the content accessible via the weblink (e.g., a web page) may be scanned and hashed by the weblink content scanning system 120 at 540. The hash of the content accessible via the weblink may be compared to the stored hash data in the hash data store 128 at 550. The comparison in the weblink content scanning system 120 may yield a matching hash in the hash data store 128. The stored hash that matches the hash of the content accessible via the weblink may be categorized as non-malicious. Because the matching hash is categorized as non-malicious, the weblink content scanning system 120 may release the original electronic message to the electronic messaging system 130 at 560. The electronic messaging system 130 may send the original message to the recipient user computing device 504 via the enterprise network 114 at 570.

Figure 6:
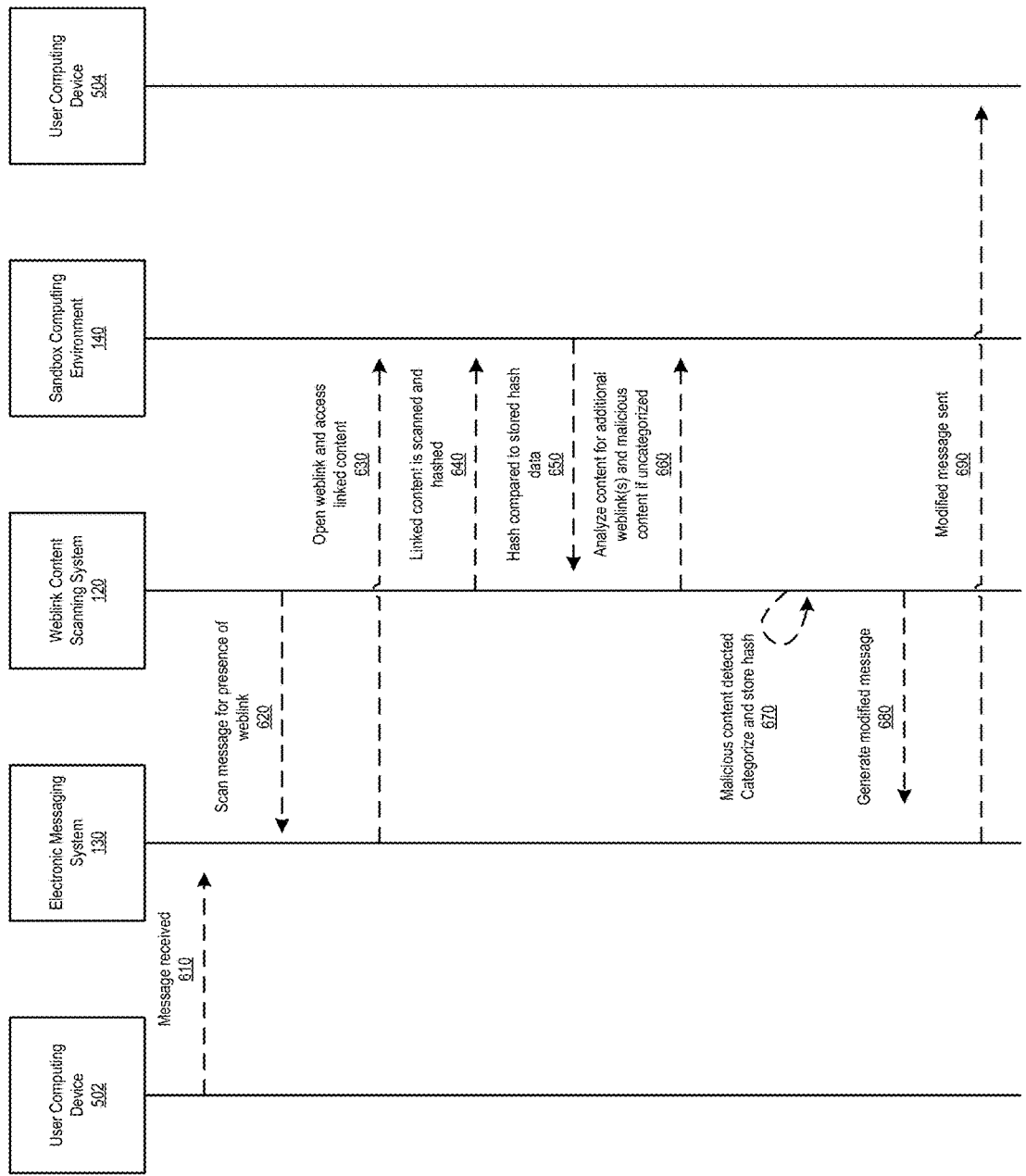
FIG. 6 shows an illustrative example of a process for real-time detection, management, and mitigation of user access to malicious content communicated through one or more electronic communication systems according to aspects of this disclosure.

FIG. 6 shows an example of an illustrative process for real-time detection, management, and mitigation of user access to malicious linked content communicated through one or more electronic communication systems. The events shown in the example of an illustrative process are merely one illustrative sequence and additional events may be added, or events may be omitted, without departing from the disclosure. At 610, the electronic messaging system 130 may receive an electronic message sent by the user computing device 502. After the electronic messaging system 130 receives the electronic message via the enterprise network 114 or external network 118, the weblink content scanning system 120 may scan the electronic message within the electronic messaging system 130 for the presence of one or more weblinks at 620. After the weblink content scanning system 120 determines a weblink is present, the weblink may be opened in the sandbox computing environment 140 to analyze the content accessible via the weblink at 630. Within the sandbox computing environment 140, the content accessible via the weblink (e.g., a web page) may be scanned and hashed by the weblink content scanning system 120 at 640. The hash of the content accessible via the weblink may be compared to the stored hash data in the hash data store 128 of the weblink content scanning system 120 at 650. The comparison in the weblink content scanning system 120 may fail to find a matching stored hash in the hash data store 128. The weblink content scanning system 120 may analyze the scanned content accessible via the weblink for one or more remote weblinks and malicious content at 660. The scan may not indicate that one or more remote weblinks are present at the content accessible via the weblink. The scan may detect malicious content and the hash of the content accessible via the weblink may be categorized as malicious at 670. The categorized hash of the content accessible via the weblink may also be stored in the hash data store 128 of the weblink content scanning system 120 at 670. The weblink content scanning system 120 may modify the original electronic message to generate a modified electronic message and release the modified electronic message to the electronic messaging system 130 at 680. The modification to the message may include information corresponding to the removed weblink, where the hash of the content accessible via the weblink was categorized as malicious. The electronic messaging system 130 may send the modified electronic message to the recipient user computing device 504 via the enterprise network 114 at 690.

Figure 7:
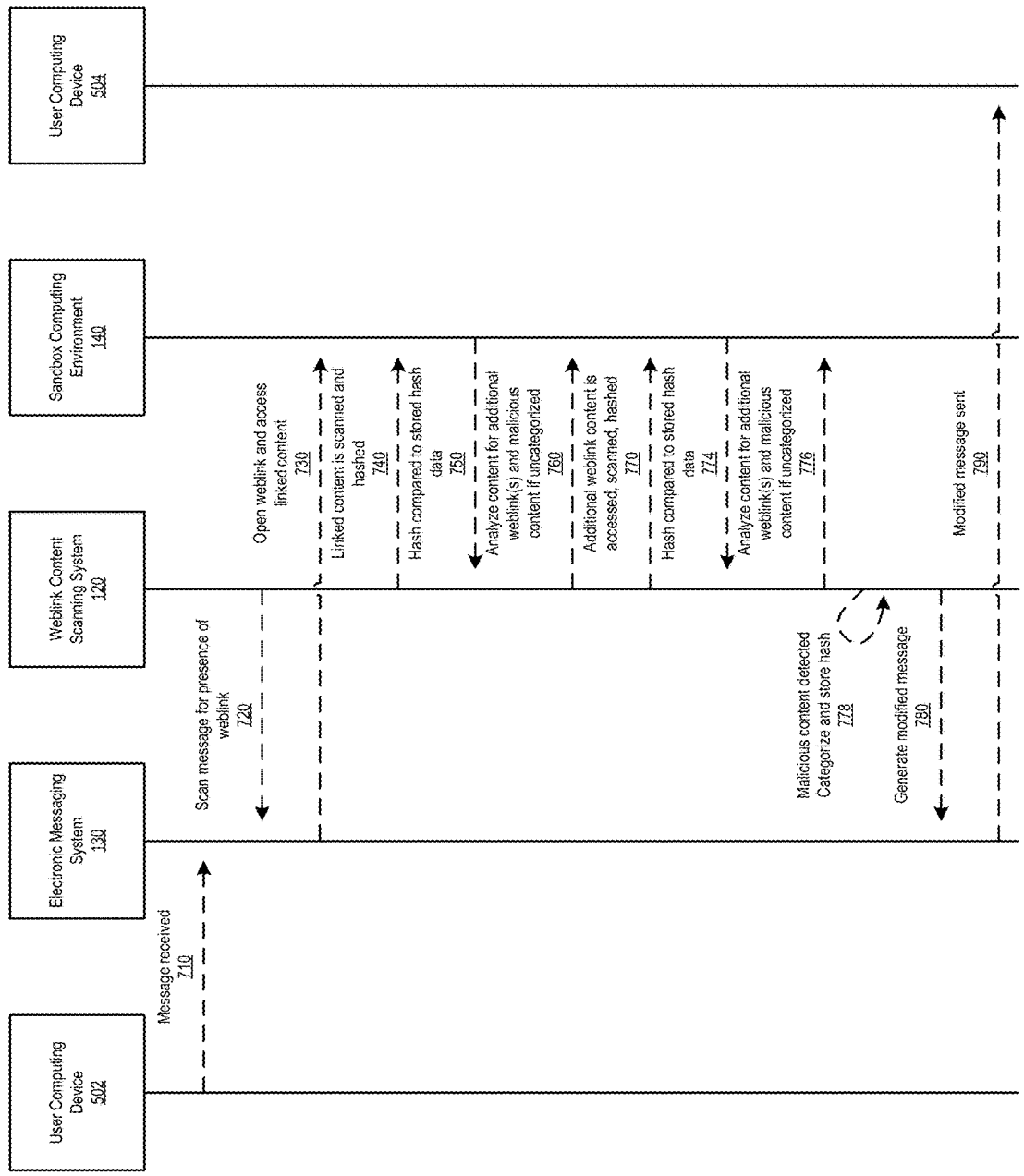
FIG. 7 shows an illustrative example of a process for real-time detection, management, and mitigation of user access to malicious content communicated through one or more electronic communication systems according to aspects of this disclosure.

FIG. 7 shows an example of an illustrative process for real-time detection, management, and mitigation of user access to malicious linked content communicated through one or more electronic communication systems. The events shown are merely one illustrative sequence and additional events may be added, or events may be omitted, without departing from the disclosure. At 710, the electronic messaging system 130 may receive an electronic message sent by the user computing device 502. After the electronic messaging system 130 receives the electronic message via the enterprise network 114 or external network 118, the weblink content scanning system 120 may scan the electronic message within the electronic messaging system 130 for the presence of one or more weblinks at 720. When the weblink content scanning system 120 determines a weblink is present, the weblink may be opened in the sandbox computing environment 140 to analyze the content accessible via the weblink at 730. Within the sandbox computing environment 140, the content accessible via the weblink (e.g., a web page or other content) may be scanned and hashed by the weblink content scanning system 120 at 740. The hash of the content accessible via the weblink may be compared to the stored hash data in the hash data store 128 at 750. The comparison in the weblink content scanning system 120 may fail to find a matching hash in the hash data store 128.

The weblink content scanning system 120 may analyze the scanned content accessible via the weblink for one or more remote weblinks and malicious content at 760. The scan may indicate that a remote weblink is present within the content accessible via the weblink. The weblink content scanning system 120 may be configured to further access content via the remote weblink in the sandbox computing environment 140 and to analyze this accessed content to determine whether the content may be safely accessed. At 770, the content accessible via the remote weblink (e.g., a web page) may be scanned and hashed by the weblink content scanning system 120. At 774, the hash may be compared to the stored hash data in the hash data store 128 of the weblink content scanning system 120. The comparison in the weblink content scanning system 120 may fail to find a matching stored hash in the hash data store 128 at 774. Analysis of the scanned content accessible via the remote weblink at 776 may detect malicious content. The hashes of the content accessible via the weblink and the remote weblink may be categorized as malicious at 778. The categorized hash of the content accessible via the weblink and the remote weblink may also be stored in the hash data store 128 at 778. The weblink content scanning system 120 may modify the original electronic message to generate a modified electronic message and release the modified electronic message to the electronic messaging system 130 at 780. In some cases, the modification to the message may include information corresponding to a removed weblink. The electronic messaging system 130 may send the modified electronic message to the recipient user computing device 504 via the enterprise network 114 at 790.

Figure 8:
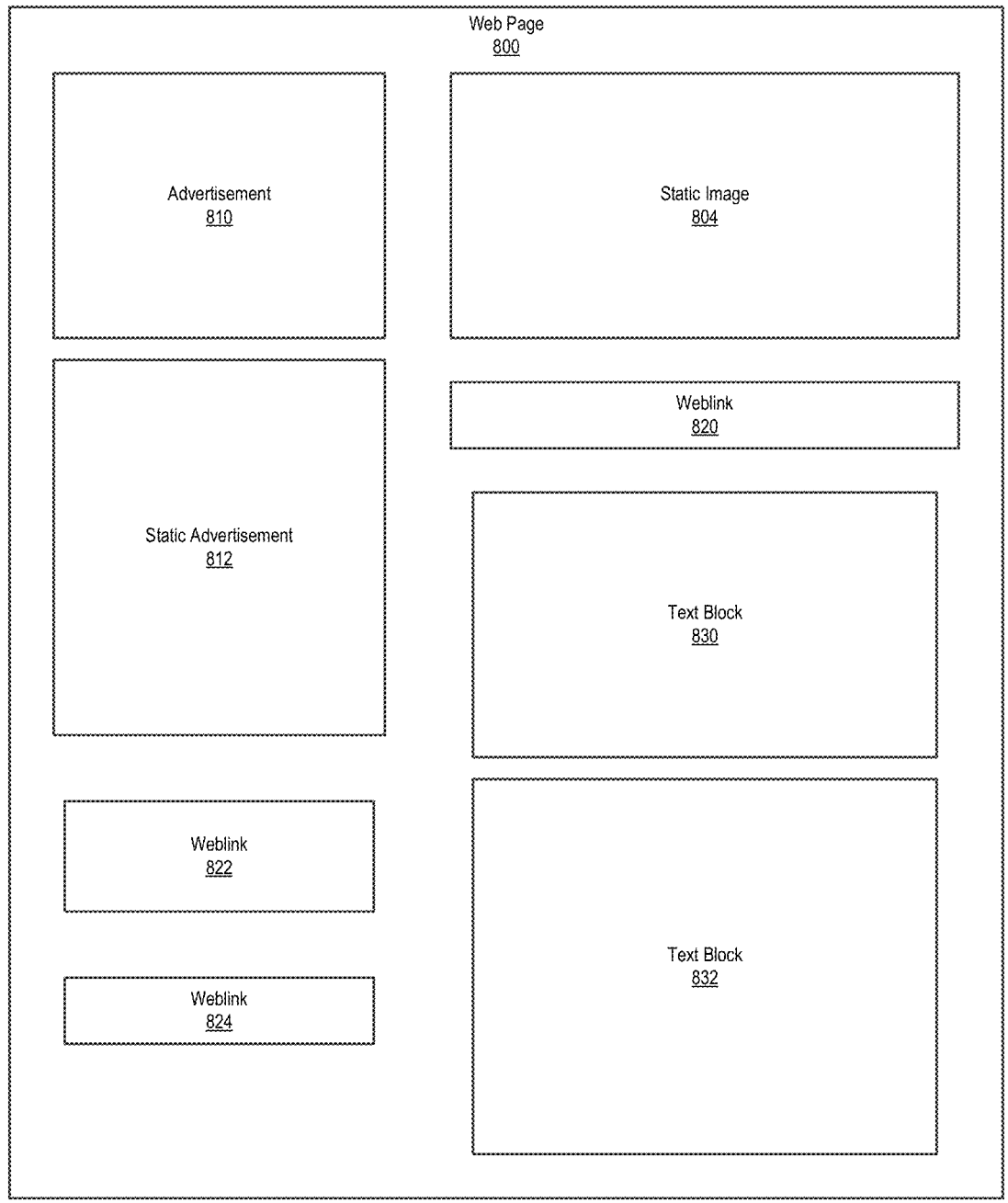
FIG. 8 shows illustrative content accessible via a weblink according to aspects of this disclosure.

FIG. 8 shows illustrative content at a networked destination accessible via a weblink. For example, a weblink received via an electronic messaging system 130 may cause a computing device to access information (e.g., an application, a web page, and the like) hosted at a remote computing device. An illustrative web page 800 may be accessible by a computing device (e.g., user computing device 102) and/or a the weblink content scanning system 120, or the like via a network connection. For example, the weblink content scanning system 120 may cause the web page 800 to be accessed within a sandbox computing environment 140. In some cases, an accessed webpage may include static content (e.g., text, images, and the like) and/or active content (e.g., applets, executable code, applications, video objects, image objects, embedded objects, audio objects, animations and the like). For example, web page 800 may include a mixture of static content and active content, such as advertisements 810 and 812, image content (e.g., image 804), text data (e.g., text blocks 830 and 832) and the like. In some cases, one or more of the static content or active content may be associated with one or more weblinks, such as weblinks 820, 822, and 824. Such, weblinks may be visible to a viewer or may be hidden (e.g., a link accessed by clicking an image). Weblinks may be associated with safely accessible content, (e.g., advertiser content, user defined content, informational content, entertainment content and the like) or may be associated to malicious content and/or potentially malicious content. In some cases, the content accessed via a weblink may change over time, such that content accessed at a first time may be different than content accessed at a later time.

Figure 9:
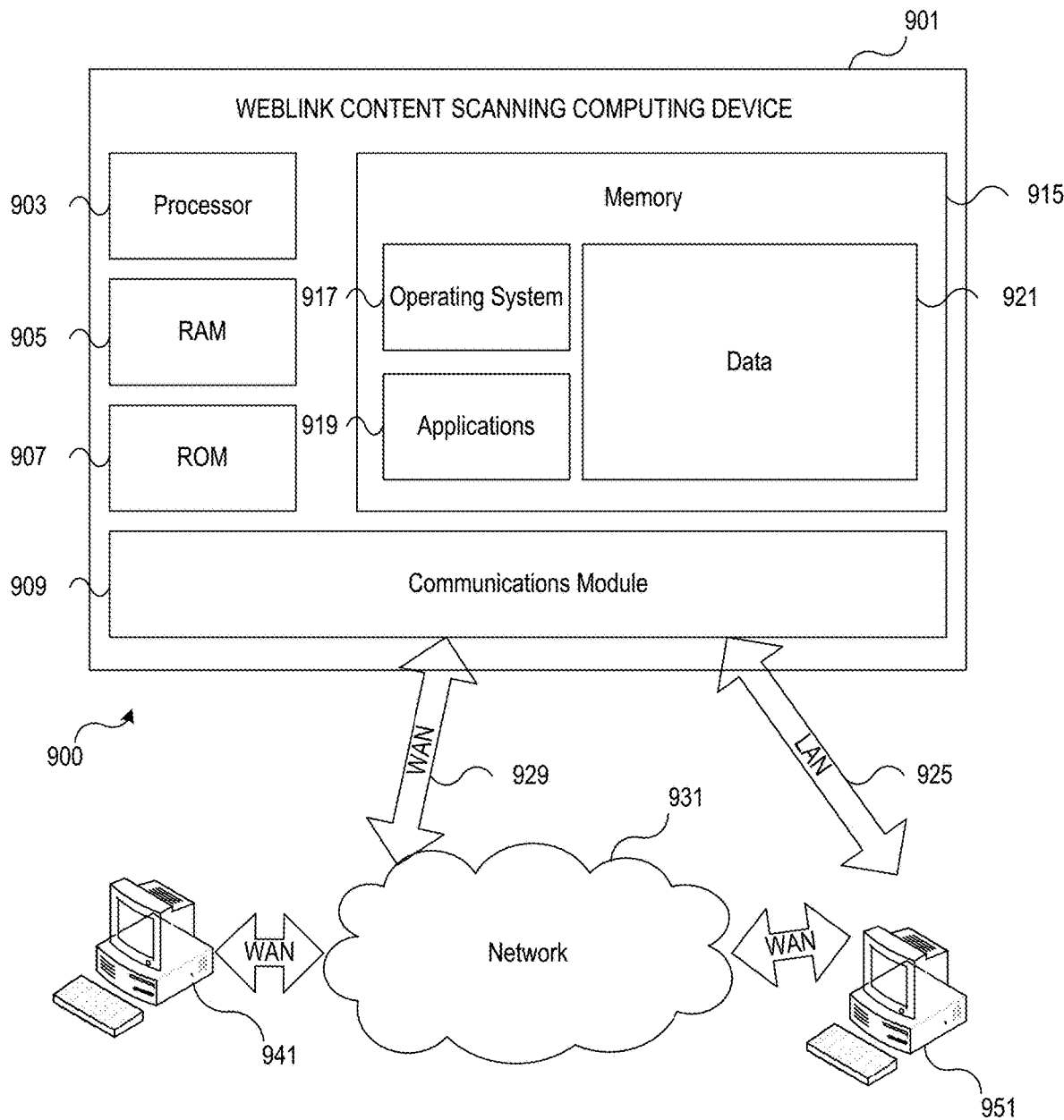
FIG. 9 shows an illustrative operation complexity graph operating environment in which various aspects of the disclosure may be implemented in accordance with one or more aspects described herein.

FIG. 9 shows an illustrative operating environment in which various aspects of the present disclosure may be implemented in accordance with one or more example embodiments. Referring to FIG. 9, a computing system environment 900 may be used according to one or more illustrative embodiments. The computing system environment 900 is only one example of a suitable computing environment and is not intended to suggest any limitation as to the scope of use or functionality contained in the disclosure. The computing system environment 900 should not be interpreted as having any dependency or requirement relating to any one or combination of components shown in the illustrative computing system environment 900.

The computing system environment 900 may include an illustrative weblink content scanning computing device 901 having a processor 903 for controlling overall operation of the weblink content scanning computing device 901 and its associated components, including a Random Access Memory (RAM) 905, a Read-Only Memory (ROM) 907, a communications module 909, and a memory 915. The weblink content scanning computing device 901 may include a variety of computer readable media. Computer readable media may be any available media that may be accessed by the weblink content scanning computing device 901, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the weblink content scanning computing device 901.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 903 of the weblink content scanning computing device 901. Such a processor may execute computer-executable instructions stored on a computer-readable medium.

Software may be stored within the memory 915 and/or other digital storage to provide instructions to the processor 903 for enabling the weblink content scanning computing device 901 to perform various functions as discussed herein. For example, the memory 915 may store software used by the weblink content scanning computing device 901, such as an operating system 917, one or more application programs 919, and/or an associated database 921. In addition, some or all of the computer executable instructions for the weblink content scanning computing device 901 may be embodied in hardware or firmware. Although not shown, the RAM 905 may include one or more applications representing the application data stored in the RAM 905 while the weblink content scanning computing device 901 is on and corresponding software applications (e.g., software tasks) are running on the weblink content scanning computing device 901.

The communications module 909 may include a microphone, a keypad, a touch screen, and/or a stylus through which a user of the weblink content scanning computing device 901 may provide input, and may include one or more of a speaker for providing audio output and a video display device for providing textual, audiovisual and/or graphical output. The computing system environment 900 may also include optical scanners (not shown).

The weblink content scanning computing device 901 may operate in a networked environment supporting connections to one or more remote computing devices, such as the computing devices 941 and 951. The computing devices 941 and 951 may be personal computing devices or servers that include any or all of the elements described above relative to the weblink content scanning computing device 901.

The network connections depicted in FIG. 9 may include a Local Area Network (LAN) 925 and/or a Wide Area Network (WAN) 929, as well as other networks. When used in a LAN networking environment, the weblink content scanning computing device 901 may be connected to the LAN 925 through a network interface or adapter in the communications module 909. When used in a WAN networking environment, the weblink content scanning computing device 901 may include a modem in the communications module 909 or other means for establishing communications over the WAN 929, such as a network 931 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 10:
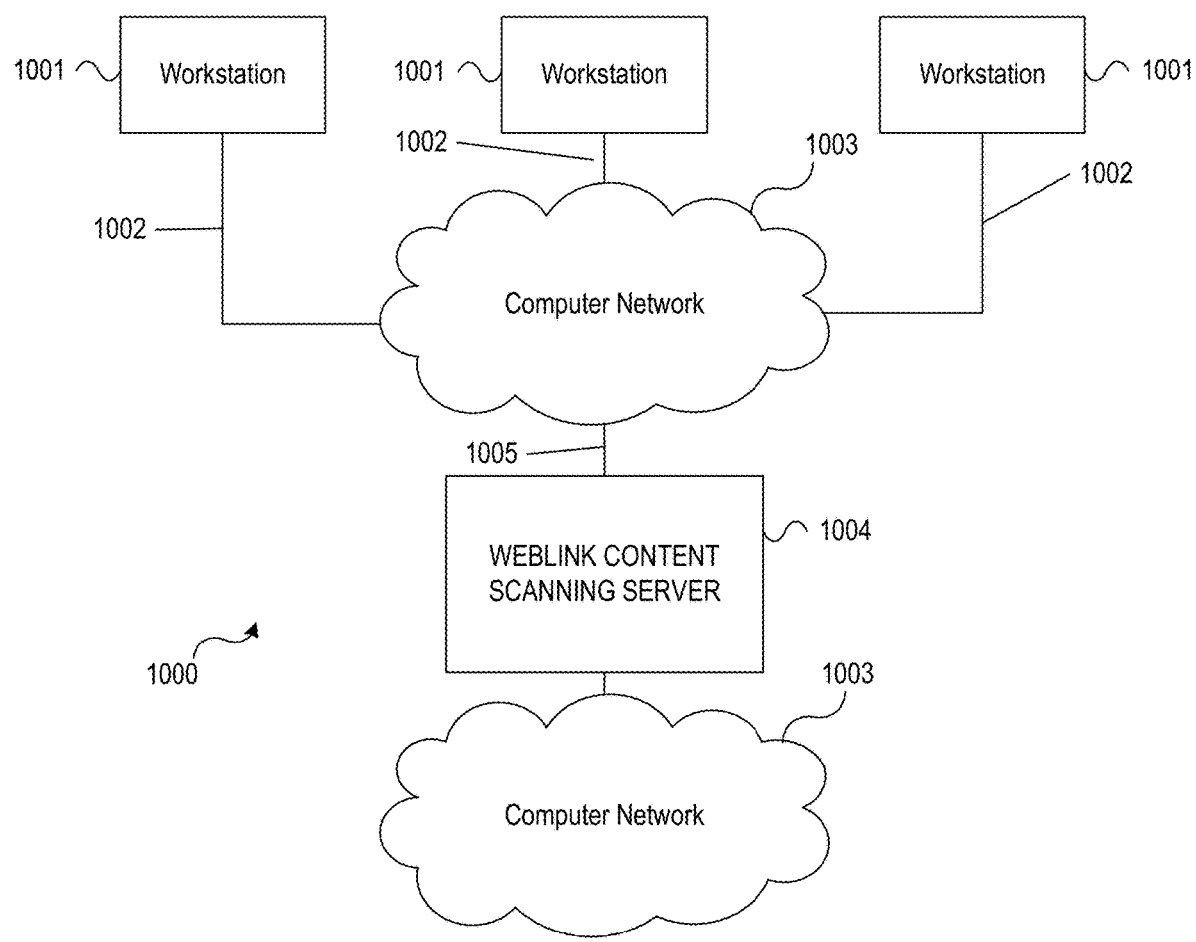
FIG. 10 shows an illustrative block diagram of workstations and servers that may be used to implement the processes and functions of certain aspects of the present disclosure in accordance with one or more aspects described herein.

FIG. 10 shows an illustrative block diagram of workstations and servers that may be used to implement the processes and functions of certain aspects of the present disclosure in accordance with one or more example embodiments. For example, an illustrative system 1000 may be used for implementing illustrative embodiments according to the present disclosure. As illustrated, the system 1000 may include one or more workstation computers 1001. The workstations 1001 may be, for example, a desktop computer, a smartphone, a wireless device, a tablet computer, a laptop computer, and the like, configured to perform various processes described herein. The workstations 1001 may be local or remote, and may be connected by one of the communications links 1002 to a computer network 1003 that is linked via the communications link 1005 to the weblink content scanning server 1004. In the system 1000, the weblink content scanning server 1004 may be a server, processor, computer, or data processing device, or combination of the same, configured to perform the functions and/or processes described herein. The weblink content scanning server 1004 may be used to receive check images and associated data and/or validation scores, retrieve user profile, evaluate the check image compared to the user profile, identify matching or non-matching elements, generate user interfaces, and the like.

The computer network 1003 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 1002 and 1005 may be communications links suitable for communicating between the workstations 1001 and the weblink content scanning server 1004, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in some embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A computing platform, comprising:
   at least one processor;
   a communication interface communicatively coupled to the at least one processor; and
   memory storing computer-readable instructions that, when executed by the at least one processor, cause the computing platform to:
   receive, from a computing device external to a secure network environment, an electronic message to a recipient computing device within the secure network environment, wherein the electronic message comprises a first weblink;
   access, by an analysis engine and within a sandbox computing environment, first content associated with the first weblink;
   generate, by the analysis engine, a first hash corresponding to the first content accessed via the first weblink; assign, by the analysis engine, a hash category to the first hash based on a comparison of the first hash to a plurality of categorized hashes in a hash data store;
   analyze, based on a determination that additional content is accessible via the first weblink, each level of a plurality of levels for nested weblinks to additional content accessible, wherein the first weblink is associated with a first level and a successive level is accessible via a nested weblink of a preceding level of the plurality of levels;
   generate, by the analysis engine, a level hash corresponding to content accessed each nested weblink;
   compare, by the analysis engine, the hash category to the first hash based on a comparison of each nested hash associated with each of the plurality of nested levels to the plurality of categorized hashes in the hash data store;
   associate, by the analysis engine, the first weblink to a malicious category when at least one nested level of the plurality of nested levels is associated with the malicious category;
   communicate, to the recipient computing device when the first hash matches a stored hash of the plurality of categorized hashes and based on the hash category of the stored hash matching a non-malicious category, the electronic message; and
   communicate, to the recipient computing device when the first hash matches a stored hash of the plurality of categorized hashes and based on the hash category of the stored hash matching the malicious category, a modified electronic message without the first weblink.

2. The computing platform of claim 1, wherein the instructions, when executed by the one or more processors, cause the computing platform to:
   generate, by the analysis engine, the modified electronic message by removing the first weblink or disabling the first weblink.

3. The computing platform of claim 1, wherein the instructions, when executed by the one or more processors, cause the computing platform to:
   communicate, by the analysis engine, a notification to a second computing device, wherein the notification comprises information corresponding to a presence of potentially malicious content accessible via the first weblink.

4. The computing platform of claim 1, wherein the instructions, when executed by the one or more processors, cause the computing platform to:
   analyze, by the analysis engine, the first content accessed via the first weblink for potentially malicious content;
   analyze, by the analysis engine, additional content of another level, wherein the additional content is accessible via the nested weblink of a preceding level of the plurality of levels;
   associate, by the analysis engine and based on analysis of the first content and the additional content, a first hash category or a second hash category with the first hash, wherein the first hash category corresponds to at least potentially malicious content of at least one of the additional content and the additional content accessible via the nested weblink of the preceding level of the plurality of levels, and the second hash category corresponds to safely accessible content of the additional content and the additional content accessible at each level of the plurality of levels; and
   store, by the analysis engine, an association between an associated hash category and the first weblink in the hash data store.

5. The computing platform of claim 1, wherein the instructions, when executed by the one or more processors, cause the computing platform to:
   associate, by the analysis engine, message information associated with the first weblink to the hash of the first weblink, wherein the message information comprises an identifier of a source computing device of the electronic message and an identifier of the recipient computing device associated with the electronic message.

6. The computing platform of claim 1, wherein the instructions, when executed by the one or more processors, cause the computing platform to:
   access, by the analysis engine and within the sandbox computing environment, second content associated with a second weblink, wherein the first content comprises the second weblink;
   generate, by the analysis engine, a second hash of the second content accessed via the second weblink; and
   associate, by the analysis engine and based on a comparison of the second hash to the plurality of categorized hashes in the hash data store, one of a first hash category or a second hash category with the second hash, wherein the first hash category corresponds to at least potentially malicious content and the second hash category corresponds to safely accessible content.

7. The computing platform of claim 6, wherein the instructions, when executed by the one or more processors, cause the computing platform to:

analyze, by the analysis engine, the second content accessed via the second weblink for potentially malicious content; and store, by the analysis engine in the hash data store, an association between an associated hash category, the second hash, and the second weblink.

8. A method, comprising:

receiving, from a computing device external to a secure network environment, an electronic message for delivery to a recipient computing device within the secure network environment, wherein the electronic message comprises a first weblink;

accessing, by an analysis engine and within a sandbox computing environment, first content associated with the first weblink;

generating, by the analysis engine, a first hash corresponding to the first content accessed via the first weblink;

assigning, by the analysis engine, a hash category to the first hash based on a comparison of the first hash to a plurality of categorized hashes in a hash data store;

analyzing, based on a determination that additional content is accessible via the first weblink, each level of a plurality of levels for nested weblinks to additional content accessible, wherein the first weblink is associated with a first level and a successive level is accessible via a nested weblink of a preceding level of the plurality of levels;

generating, by the analysis engine, a level hash corresponding to content accessed each nested weblink;

comparing, by the analysis engine each level hash associated with each of the plurality of nested levels to the plurality of categorized hashes in the hash data store;

associating, by the analysis engine, the first weblink to a malicious category when at least one nested level of the plurality of nested levels is associated with the malicious category;

communicating, to the recipient computing device when the first hash matches a stored hash of the plurality of categorized hashes and based on the hash category of the stored hash matching a non-malicious category, the electronic message; and communicate, to the recipient computing device when the first hash matches a stored hash of the plurality of categorized hashes and based on the hash category of the stored hash matching a malicious category, a modified electronic message, wherein the modified electronic message comprises at least a portion of the electronic message without the first weblink.

9. The method of claim 8, comprising:

generating, by the analysis engine, the modified electronic message by generating a new electronic message comprising a portion of the electronic message and information corresponding to a categorization of the first weblink.

10. The method of claim 8, comprising:

communicating, by the analysis engine and the secure network environment, a notification to a second computing device, wherein the notification comprises information indicating a presence of potentially malicious content that is accessible via the first weblink.

11. The method of claim 8, comprising:

analyzing, by the analysis engine, the first content accessed via the first weblink for potentially malicious content;

associating, by the analysis engine and based on analysis of the first content, a first hash category or a second hash category with the first hash, wherein the first hash category corresponds to at least potentially malicious content and the second hash category corresponds to safely accessible content; and storing, by the analysis engine, information corresponding to an association between an associated hash category and the first weblink in the hash data store.

12. The method of claim 8, comprising:

accessing, by the analysis engine and within the sandbox computing environment, second content associated with a second weblink, wherein the first content comprises the second weblink;

generating, by the analysis engine, a second hash of the second content accessed via the second weblink; and associating, by the analysis engine and based on a comparison of the second hash to the plurality of categorized hashes in the hash data store, one of a first hash category or a second hash category with the second hash, wherein the first hash category corresponds to at least potentially malicious content and the second hash category corresponds to safely accessible content.

13. The method of claim 12, comprising:

analyzing, by the analysis engine, the second content accessed via the second weblink for potentially malicious content; and storing, by the analysis engine, information corresponding to an association between an associated hash category of the second hash and the second weblink.

14. The method of claim 12, comprising:

associating, by the analysis engine, access information to the second weblink, wherein the access information comprises an identifier of the first content, an identifier of a source computing device of the electronic message, and an identifier of the recipient computing device associated with the electronic message.

15. One or more non-transitory computer-readable media storing instructions that, when executed by a computing platform comprising at least one processor, memory, and a communication interface, cause the computing platform to:

receive, by a computing device within a secure network environment, an electronic message to a recipient computing device, wherein the electronic message comprises a first weblink;

access, by an analysis engine and within a sandbox computing environment, first content associated with the first weblink;

generate, by the analysis engine, a first hash corresponding to the first content accessed via the first weblink;

assign, by the analysis engine, a hash category to the first hash based on a comparison of the first hash to a plurality of categorized hashes in a hash data store;

analyze, based on a determination that additional content is accessible via the first weblink, each level of a plurality of levels for nested weblinks to additional content accessible, wherein the first weblink is associated with a first level and a successive level is accessible via a nested weblink of a preceding level of the plurality of levels;

generate, by the analysis engine, a level hash corresponding to content accessed each nested weblink;

compare, by the analysis engine, each nested hash associated with each of the plurality of nested levels to the plurality of categorized hashes in the hash data store;

associate, by the analysis engine, the first weblink to a malicious category when at least one nested level of the plurality of nested levels is associated with the malicious category; and communicate, to the recipient computing device when the first hash matches a stored hash of the plurality of categorized hashes and based on the hash category of the stored hash matching a malicious category, a modified electronic message with the first weblink disabled.

16. The one or more non-transitory computer-readable media of claim 15, wherein the instructions, when executed by the one or more processors, cause the computing platform to:
generate, by the analysis engine, the modified electronic message by removing the first weblink from the electronic message.

17. The one or more non-transitory computer-readable media of claim 15, wherein the instructions, when executed by the one or more processors, cause the computing platform to:
communicate, by the analysis engine and the secure network environment, an alert to a second computing device, wherein the alert comprises information indicating a presence of potentially malicious content accessible via the first weblink.

18. The one or more non-transitory computer-readable media of claim 15, wherein the instructions, when executed by the one or more processors, cause the computing platform to:
analyze, by the analysis engine, the first content accessed via the first weblink for potentially malicious content;
associate, by the analysis engine and based on analysis of the first content, a first hash category or a second hash category with the first hash, wherein the first hash category corresponds to at least potentially malicious content and the second hash category corresponds to safely accessible content; and
store, by the analysis engine in the hash data store, information corresponding to an association between a hash category and the first weblink.

19. The one or more non-transitory computer-readable media of claim 18, wherein the instructions, when executed by the one or more processors, cause the computing platform to:
access, by the analysis engine and within the sandbox computing environment, second content associated with a second weblink, wherein the first content comprises the second weblink;
generate, by the analysis engine, a second hash of the second content accessed via the second weblink; and
associate, by the analysis engine and based on a comparison of the second hash to the plurality of categorized hashes in the hash data store, one of the first hash category or the second hash category with the second hash.

20. The one or more non-transitory computer-readable media of claim 19, wherein the instructions, when executed by the one or more processors, cause the computing platform to:
analyze, by the analysis engine, the second content accessed via the second weblink for potentially malicious content; and
store, by the analysis engine, information corresponding to an association between the second hash and the second weblink.

* * * * *